(No Model.)
W. R. PATTERSON.
AERIAL CABLE.
No. 292,847.  Patented Feb. 5, 1884.
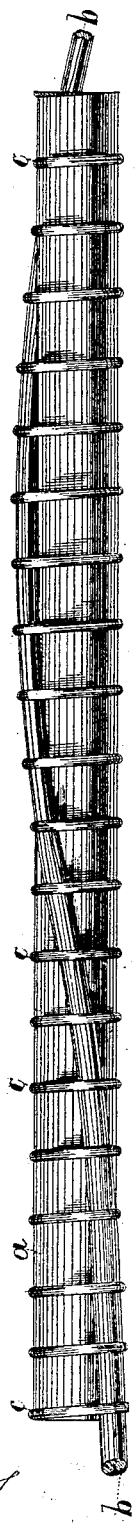
Witnesses.
William S. Granger
Millard R. Powers
Inventor
William R. Patterson
By George P. Barton
Attorney

UNITED STATES PATENT OFFICE.

WILLIAM R. PATTERSON, OF CHICAGO, ILLINOIS, ASSIGNOR, BY MESNE ASSIGNMENTS, TO THE WESTERN ELECTRIC COMPANY, OF SAME PLACE.

AERIAL CABLE.

SPECIFICATION forming part of Letters Patent No. 292,847, dated February 5, 1884.

Application filed December 5, 1881. (No model.)

*To all whom it may concern:*

Be it known that I, WILLIAM R. PATTERSON, of Chicago, Illinois, have discovered a certain new and useful Improvement in Aerial Cables, of which the following is a full, clear, concise, and exact description.

Prior to my invention the suspending-wire was placed parallel to the cable and bound on by means of short wires at frequent intervals, or by one wire wound spirally about the cable and the suspending-wire. In coiling and bending the cable the lead pipe of the cable would always stretch, unless the pipe and suspending-wire were so placed as to have the same radius of curvature. This was found to be impossible in practice.

My improvement consists in winding the suspending-wire in long spirals about the lead pipe, thereby dispensing with the tie-wires.

Under ordinary circumstances I prefer to wind a tie-wire about the lead pipe and suspending-wire, in order to protect the pipe from injury by chafing. When thus used, the tie-wire serves a double purpose of protecting the pipe from external injury and holding the suspending-wire more closely to the pipe.

In the drawing I have shown a side view of the lead pipe $a$ in combination with the suspending-wire $b$, wound spirally, and the tie-wire $c$.

I claim—

The combination, with the flexible lead pipe of a telegraph-cable, of the spirally-wound suspending-wire and the exterior spirally-wound tie-wire, whereby the suspending-wire is held in place and the lead pipe of the cable protected from external injury, substantially as and for the purpose specified.

WILLIAM R. PATTERSON.

Witnesses:
WILLIAM S. GRANGER,
GEORGE P. BARTON.